United States Patent
Ma et al.

(10) Patent No.: US 10,599,008 B1
(45) Date of Patent: Mar. 24, 2020

(54) METHOD AND DEVICE FOR ULTRAFAST GROUP-VELOCITY CONTROL VIA OPTICAL PARAMETRIC AMPLIFICATION IN CHIRPED QUASI-PHASE-MATCHING STRUCTURE

(71) Applicant: Shanghai Jiao Tong University, Shanghai (CN)

(72) Inventors: Jingui Ma, Shanghai (CN); Liejia Qian, Shanghai (CN); Bingjie Zhou, Shanghai (CN); Jing Wang, Shanghai (CN); Peng Yuan, Shanghai (CN); Guoqiang Xie, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 0 days.

(21) Appl. No.: 16/361,161

(22) Filed: Mar. 21, 2019

(51) Int. Cl.
*G02F 1/39* (2006.01)
*H01S 3/00* (2006.01)
*G02F 1/355* (2006.01)

(52) U.S. Cl.
CPC .............. *G02F 1/39* (2013.01); *G02F 1/3551* (2013.01); *G02F 1/3558* (2013.01); *H01S 3/0057* (2013.01); *H01S 3/0092* (2013.01); *G02F 2001/392* (2013.01); *G02F 2202/20* (2013.01)

(58) Field of Classification Search
CPC ........ G02F 1/3551; G02F 1/3558; G02F 1/39; G02F 2001/392; G02F 2202/20; H01S 3/0057; H01S 3/0092
See application file for complete search history.

(56) References Cited

U.S. PATENT DOCUMENTS 6,873,454 B2 * 3/2005 Barty ................. G02F 1/39
359/330
6,970,276 B2 * 11/2005 Kurz ................. G02F 1/3775
359/237

(Continued)

OTHER PUBLICATIONS

Bingjie Zhou et al., "Ultrafast group-velocity control via cascaded quadratic nonlinearities in optical parametric amplification," Optics Letters, vol. 43, No. 15, pp. 3790-3793 (Aug. 1, 2018).

*Primary Examiner* — Daniel Petkovsek
(74) *Attorney, Agent, or Firm* — Mei & Mark LLP; Manni Li

(57) ABSTRACT

Ultrafast group-velocity control method and device thereof comprising a signal path successively comprising a seed laser source, a pulse stretcher, and a first pulse compressor; a pump path comprising a pump laser source; an amplifier comprising a nonlinear crystal with chirped poled-period; and an idler path successively comprising a spectral filter and a second pulse compressor after amplifier. Both chirped signal pulse from the pulse stretcher and pump pulse from the pump source incident into the amplifier, where energy continuously transfers from the pump pulse to the chirped signal pulse and a newly generated idler pulse. The amplified chirped signal pulse is directly compressed by first pulse compressor and the generated idler pulse is firstly filtered by the spectral filter and then compressed by the second pulse compressor. After amplification and compression, both signal and idler are delayed, and group delay is adjusted by the pump intensity.

7 Claims, 4 Drawing Sheets

(56) References Cited

U.S. PATENT DOCUMENTS

| | | | |
|---|---|---|---|
| 9,014,223 B2* | 4/2015 | Miesak | H01S 3/10 |
| | | | 372/102 |
| 9,647,407 B1* | 5/2017 | Qian | H01S 3/1625 |
| 2003/0084837 A1* | 5/2003 | Lee | G02F 1/3558 |
| | | | 117/2 |
| 2003/0112492 A1* | 6/2003 | Huang | G02F 1/011 |
| | | | 359/321 |
| 2011/0043895 A1* | 2/2011 | Hikmet | G02F 1/3775 |
| | | | 359/328 |
| 2018/0231869 A1* | 8/2018 | Zhong | G02F 1/3558 |

* cited by examiner

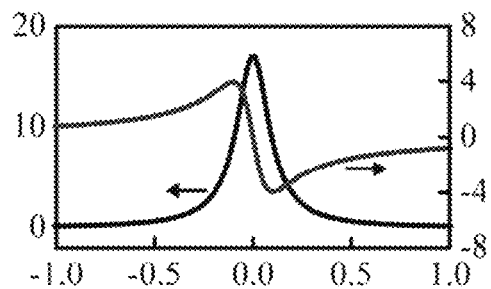
FIG. 1A
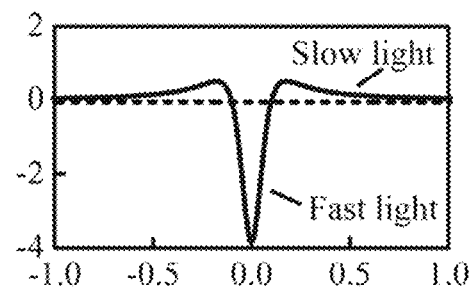
FIG. 1B
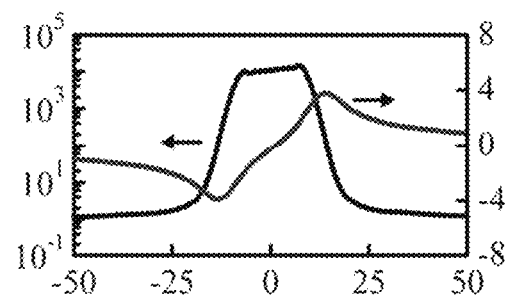
FIG. 1C
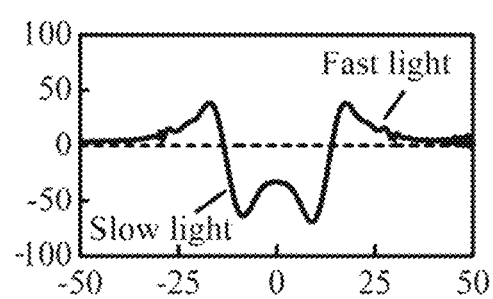
FIG. 1D
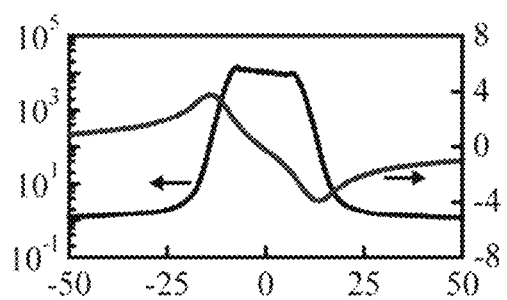
FIG. 1E
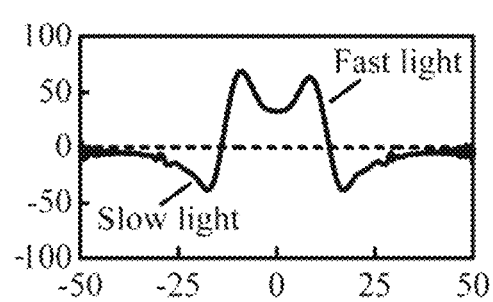
FIG. 1F
FIGURE 1

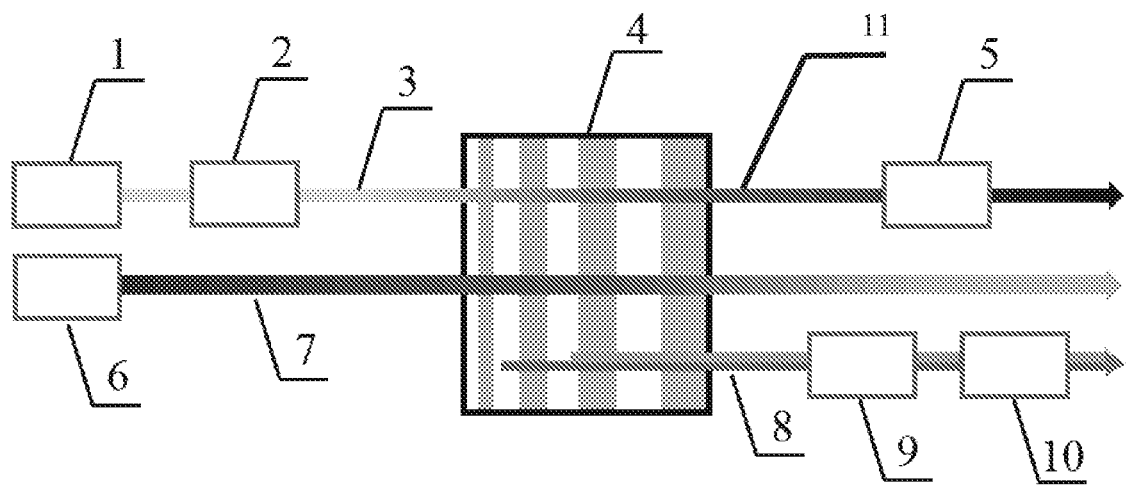
FIGURE 2
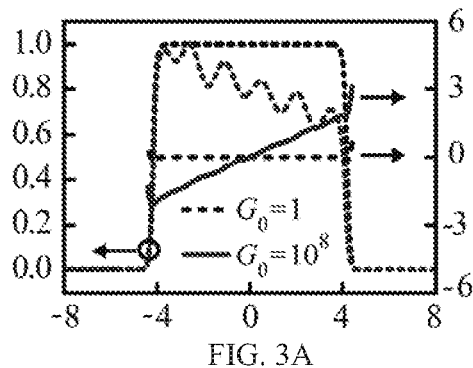
FIG. 3A
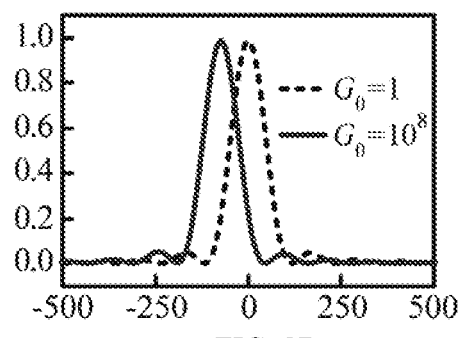
FIG. 3B
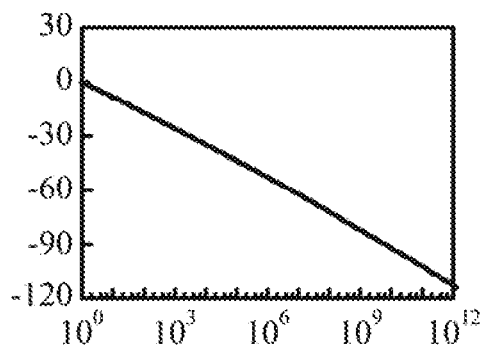
FIG. 3C
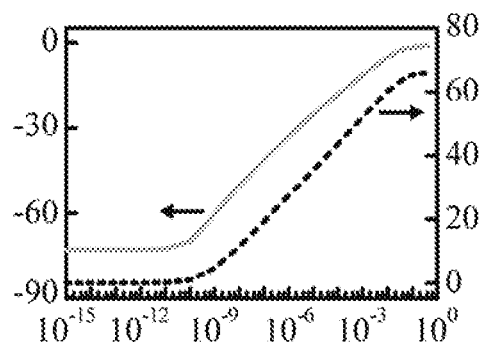
FIG. 3D
FIGURE 3

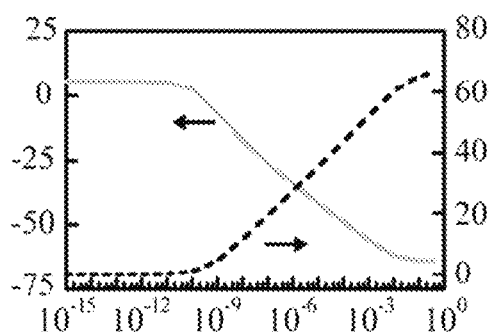
FIG. 4A
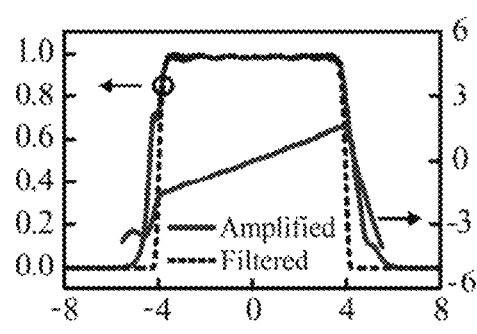
FIG. 4B
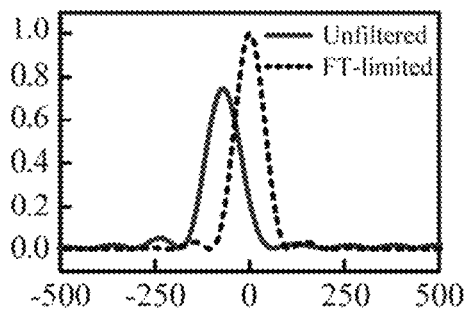
FIG. 4C
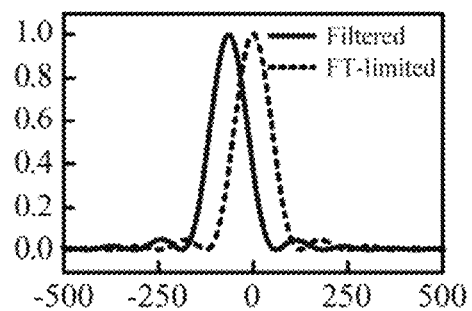
FIG. 4D
FIGURE 4

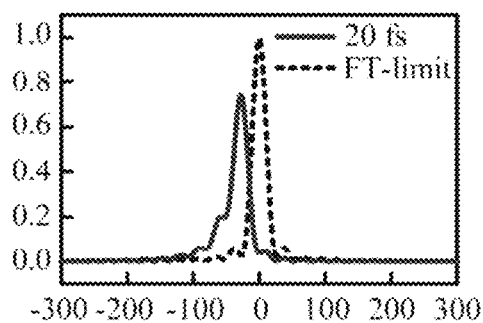
FIG. 5A
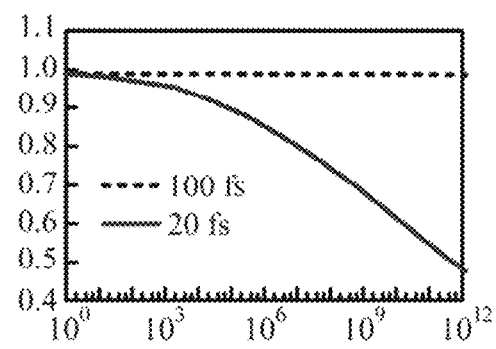
FIG. 5B
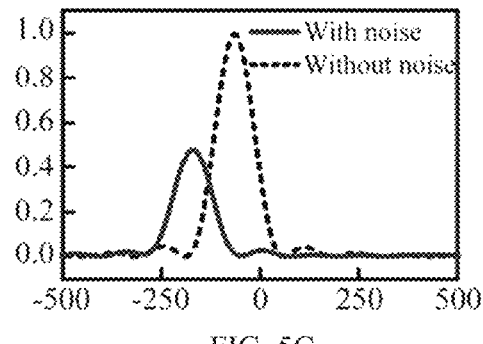
FIG. 5C
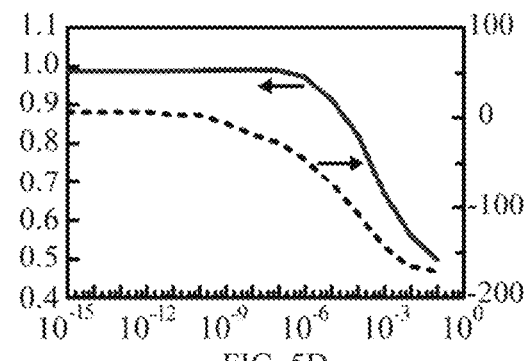
FIG. 5D
FIGURE 5

METHOD AND DEVICE FOR ULTRAFAST GROUP-VELOCITY CONTROL VIA OPTICAL PARAMETRIC AMPLIFICATION IN CHIRPED QUASI-PHASE-MATCHING STRUCTURE

FIELD OF INVENTION

The present invention relates to a method for group-velocity control, particularly, an ultrafast group-velocity control method and a device thereof that can delay femtosecond pulses in time comparable with the signal duration and maintain high fidelity.

DESCRIPTION OF RELATED ARTS

As the amount of data being transmitted rapidly grows, methods for controlling the group-velocity of femtosecond pulses become urgently in demand in the future all-optical communication system. Especially, control methods without impairment are attractive. Owing to the Kramers-Kronig relations, light amplification necessarily associates with a resonant contribution to the refraction index. Thus, the control of the group-velocity typically relies upon an optical amplifier. Up to now, control methods without impairment have been demonstrated under several types of gain resonance including population-inverted atoms, stimulated Brillouin scattering, coherent population oscillation, Raman transition, and the combination with additional structure dispersions. Notably, such a gain-assisted method is featured with an impulse response or transfer function, which is defined by the tuned amplifier itself and unaffected by signal variations. Therefore, signal pulses can keep high fidelity in the gain-assisted method.

However, the current methods of gain resonance face two fundamental limitations including the response bandwidth and group delay. For example, the Brillouin bandwidth for typical optical fibers is only about 50 MHz, which can only be used to delay picosecond pulses, and the resultant group delay is only a few percent of the signal pulse duration, which is too small for practical applications in optical communications. On the other hand, nonlinear refraction index and more generally nonlinear phase shifts may also control group-velocity effectively as long as the nonlinearities in systems are highly dispersive. The nonlinear control of the group-velocity has been observed in crystals that possess spatial-nonlocal nonlinearity, temporal-nonlocal Kerr nonlinearity, and the cascaded quadratic nonlinearity in the second harmonic generation. However, these nonlinear systems cannot be treated by impulse responses and are highly dependent on the signal intensity itself. In other words, a flexible controllable method that can delay femtosecond pulses in time comparable with the signal duration and maintain high fidelity has never been proposed.

SUMMARY OF THE INVENTION

The present invention provides an ultrafast group-velocity control method via optical parametric amplification (OPA) in chirped quasi-phase-matching (QPM) structures, which is used to delay femtosecond pulses in time comparable with the pulse duration and maintain high fidelity.

In the present invention, resonant cascaded nonlinearity underlies the group-velocity control. The group-velocity mismatch (GVM) between signal and idler pulses is a key factor in constructing the resonant cascaded nonlinearity. In conventional optical parametric amplifications, while the effect of the group-velocity mismatch contributes to the resonant cascaded nonlinearity, it limits gain bandwidth. To achieve a large bandwidth in conventional optical parametric amplifications, it is routinely necessary to match the group-velocity for signal and idler (GVM=0). Thus, broadband response of the group-velocity control cannot be obtained in conventional optical parametric amplifications. However, in the present invention, the bandwidth limitation caused by the group-velocity mismatch is resolved by using chirped quasi-phase-matching. In the case, each spectral combination of three interacting waves is phase-matched at a specific position in the chirped quasi-phase-matching crystal, resulting in an equivalently broadband phase-matching. Moreover, each spectral component experiences high-gain amplification. Thus, the optical parametric amplification in chirped quasi-phase-matching structures is a unique method with simultaneous broadband gain and group-velocity mismatch (GVM≠0), which makes the group-velocity control possible in the femtosecond regime.

The present invention provides an ultrafast group-velocity control method comprising a signal path, a pump path, an amplifier, and an idler path. The signal path successively comprises a seed laser source, a pulse stretcher, and a pulse compressor. The pump path comprises a pump laser source. The amplifier comprises a nonlinear crystal with chirped poled-period, which changes sign of the nonlinear coefficient in each domain period and forms chirped quasi-phase-matching structure. The idler path successively comprises a spectral filter and a pulse compressor after the amplifier. Both the chirped signal pulse from the pulse stretcher and the pump pulse from the pump laser source incident into the amplifier, where energy continuously transfers from the pump pulse to the chirped signal pulse and a newly generated idler pulse. The amplified chirped signal pulse is directly compressed by the first pulse compressor while the generated idler pulse is firstly filtered by the spectral filter and then compressed by the second pulse compressor.

In the present invention, the chirped signal pulse and the pump pulse are collinear in the amplifier, and the idler spectrum output from the amplifier is filtered to cut the spectral edges to achieve high fidelity.

In the present invention, the nonlinear crystal is a chirped-period-poled $LiNbO_3$ (CPPLN), which has linearly varying domain periods of 29.2-32.3 μm (L=15 mm) for 100-fs seed signal and 27.2-35.1 μm (L=20 mm) for 20-fs seed signal when the wavelengths of the three interacting waves are set to 1064 nm (pump), 1550 nm (signal), and 3393 nm (idler), respectively.

In the chirped quasi-phase-matching crystal, each spectral combination of three interacting waves is phase-matched at a specific position. Beyond its own phase-matching point, each spectral combination is highly phase-mismatched. In the situation, the signal pulse experiences a cascaded nonlinear phase induced by the phase mismatch via the processes of optical parametric amplification and its back conversion. Additionally, the group-velocity mismatch between the signal and idler pulses causes phase mismatch in the frequency domain. Because the GVM-caused phase-mismatch linearly varies with the signal frequency detuning and the cascaded nonlinear phase is approximately proportional to phase-mismatch within the gain spectrum, the cascaded nonlinear phase is a nearly linear function of frequency, showing a strong resonance behavior. Thus, the GVM-resulted cascaded nonlinearity possesses a resonance characteristic in the present invention. Owing to such a resonant cascaded nonlinearity, both the signal and idler pulses can be delayed or advanced. Notably, the response bandwidth of the cascaded nonlinearity is large enough to support femtosecond pulses owing to the deliberately introduced chirped quasi-phase-matching.

The present invention has advantages of broad bandwidth, large group delay, high fidelity, and direct compatibility with integrated optics, which makes the invention attractive to both fundamental research and applied science. These and other objectives, features, and advantages of the present invention are further explained in the following detailed description, the accompanying drawings, and the appended claims.

BRIEF DESCRIPTION OF THE DRAWINGS

FIG. 1 includes FIGS. 1A through FIG. 1F that compare the cascaded nonlinearity in the present invention with the resonant response of material systems of the existing technology, among which, FIG. 1A shows typical isolated absorption resonance in the sodium gas vapor in the material systems of the existing technology (vertical axis on the left shows absorption ($cm^{-1}$) and vertical axis on the right shows index change ($\times 10^{-5}$), and horizontal axis shows frequency detuning (GHz)), and FIG. 1B shows the group index of the sodium gas vapor (vertical axis on the left shows group index ($\times 100$), and horizontal axis shows frequency detuning (GHz));

FIG. 1C shows the parametric gains and cascaded nonlinear phases of the present invention for GVM=−96 fs/mm (real) (vertical axis on the left shows parametric gain and vertical axis on the right shows nonlinear phase (rad), and horizontal axis shows frequency detuning (THz)), and FIG. 1D shows the resulting group delays (vertical axis on the left shows group delay (fs), and horizontal axis shows frequency detuning (THz)); and FIG. 1E shows the parametric gains and cascaded nonlinear phases of the present invention for GVM=96 fs/mm (artificial)(vertical axis on the left shows parametric gain and vertical axis on the right shows nonlinear phase (rad), and horizontal axis shows frequency detuning (THz)), and FIG. 1F shows the resulting group delays (vertical axis on the left shows group delay (fs), and horizontal axis shows frequency detuning (THz)).

FIGS. 1C, 1D, 1E, and 1F show OPA resonances probed by detuning the monochromatic signal, and the optical parametric amplification is assumed in the small-signal amplification regime at a gain of $10^4$, and a CPPLN crystal with length of 15 mm and linearly varying domain period of 29.2-32.2 μm is used.

FIG. 2 is a schematic diagram showing the ultrafast group-velocity control method of the present invention.

FIG. 3 includes FIGS. 3A to 3D which show numerical simulation results of signal group delay for 100-fs seed signal of the present invention, among which, FIG. 3A shows output signal spectra and cascaded nonlinear phases (vertical axis on the left shows intensity (norm.) and vertical axis on the right shows nonlinear phase (rad), and horizontal axis shows Δv (THz)); FIG. 3B shows output signal pulses (vertical axis on the left shows intensity (norm.), and horizontal axis shows time (fs)); FIG. 3C shows signal group-delay versus gain (vertical axis on the left shows group delay (fs), and horizontal axis shows $G_0$), and all of the FIGS. 3A, 3B, and 3C are performed in the small-signal amplification regime ($I_{s0}/I_{p0}=10^{-15}$); FIG. 3D shows calculated signal group delay and optical parametric amplification efficiency for varied signal intensity ($I_{s0}/I_{p0}$) and fixed gain ($G_0=10^8$), and other parameters are the same as those in FIG. 1 (vertical axis on the left shows group delay (fs) and vertical axis on the right shows efficiency (%), and horizontal axis shows $I_{s0}/I_{p0}$).

FIG. 4 includes FIGS. 4A to 4D which show numerical simulation results of idler group delay for 100-fs seed signal of the present invention, among which, FIG. 4A shows calculated idler group delay and optical parametric amplification efficiency for varied signal intensity ($I_{s0}/I_{p0}$) and fixed gain ($G_0=10^8$) (vertical axis on the left shows group delay (fs) and vertical axis on the right shows efficiency (%), and horizontal axis shows $I_{s0}/I_{p0}$); FIG. 4B shows idler spectrum and cascaded nonlinear phase when $I_{s0}/I_{p0}=0.1$, wherein the dashed curve represents the output idler spectrum that is filtered to reduce the bandwidth by 10% (vertical axis on the left shows intensity (norm.) and vertical axis on the right shows nonlinear phase (rad), and horizontal axis shows Δv (THz)); FIG. 4C shows unfiltered idler pulse and the Fourier-transform (FT) of its spectrum (vertical axis on the left shows intensity (norm.), and horizontal axis shows time (fs)); and FIG. 4D shows filtered idler pulse and the FT of its spectrum, and other parameters are the same as those in FIG. 1 (vertical axis on the left shows intensity (norm.), and horizontal axis shows time (fs)).

FIG. 5 includes FIGS. 5A to 5D which show numerical simulation results of pulse fidelity of the present invention, among which, FIG. 5A shows output signal pulse and the FT of its spectrum when $I_{s0}/I_{p0}=10^{-15}$ and $G_0=10^8$ for 20-fs seed signal (vertical axis on the left shows intensity (norm.), and horizontal axis shows time (fs)); FIG. 5B shows intensity ratio of output signal pulse and the FT of its spectrum for varied gain and fixed input signal intensity (vertical axis on the left shows $I_s/I_f$ and horizontal axis shows $G_0$), both FIGS. 5A and 5B are performed by using such a CPPLN crystal with length of 20 mm and linearly varying domain period of 27.2-35.1 μm; FIG. 5C shows idler pulses with and without taking the seed signal noise into account for 100-fs seed signal (vertical axis on the left shows intensity (norm.), and horizontal axis shows time (fs)); and FIG. 5D shows idler group delay and intensity ratio of idler pulse and the FT of its spectrum when the seed signal noise is included (vertical axis on the left shows $I_i/I_f$ and horizontal axis shows $I_{s0}/I_{p0}$), both in FIGS. 5C and 5D, the seed signal noise, with 0.1% of seed signal energy, is included through addition of a zero-mean stochastic phasor whose real and imaginary components had uncorrelated Gaussian distributions, and other parameters are the same as those in FIG. 4.

Reference numbers are used to describe the following structures:
1—seed laser source; 2—pulse stretcher; 3—chirped signal pulse; 4—nonlinear crystal with chirped poled-period; 5—first pulse compressor; 6—pump laser source; 7—pump pulse; 8—idler pulse; 9—spectral filter; 10—second pulse compressor; 11—amplified chirped signal pulse.

DETAILED DESCRIPTION OF THE INVENTION AND EMBODIMENTS

The present invention is further described in detail according to a group of numerical simulation results.

FIG. 1, including FIGS. 1A to 1F, compares the cascaded nonlinearity in the present invention with the resonant response of material systems of the existing technology. In the case of the material systems in the existing technology, as shown in FIG. 1A, the isolated absorption resonance results in a sharp frequency dependence of the refractive index. Consequently, fast light is expected near the resonance frequency, as shown in FIG. 1B. However, the response bandwidth of group index is only ~100 MHz due to the limitation of resonance damping. In the case of the present invention as shown in FIG. 1C, there exists a similar resonance behavior that the cascaded nonlinear phase presents a sharp frequency dependence within the gain spectrum. Analogously, the central frequency of gain spectrum is referred to as the resonance frequency of optical parametric amplification with GVM≠0. The reason for the phenomenon is that the GVM-caused phase-mismatch linearly varies with the signal frequency detuning, so the cascaded nonlinear phase within the gain spectrum is a nearly linear function of frequency. Therefore, cascaded nonlinear phase produced in the present invention shows a strong resonance behavior.

Owing to such a resonant cascaded nonlinearity, the group delay shows slow light behavior near the gain spectrum center and fast light behavior in the gain spectrum edges, as shown in FIG. 1D. Notably, the response bandwidth of cascaded nonlinearity is as large as that of the optical parametric amplification gain. Under our simulated condition, the central flat group-delay spans a spectral range of ~10 THz, which is large enough to support 100 fs pulses. For a rounded discussion on resonant cascaded nonlinearities, a comparative simulation is made by changing group-velocity mismatch from −96 fs/mm to 96 fs/mm artificially, as shown in FIGS. 1E and 1F. In the situation, the cascaded nonlinear phase changes its sign too, showing a characteristic of anomalous dispersion. It represents an unusual effect that both slow and fast light can be achieved under the normal condition of signal amplification. Thus, the group-velocity mismatch effect plays a key role in manipulating group velocity in optical parametric amplification systems. The GVM-resulted cascaded nonlinearity not only behaves resonantly, but also is switchable from normal to anomalous dispersion.

FIG. 2 shows the schematic diagram of the method in the present invention. The proposed method comprises the signal path, the pump path, the amplifier and the idler path. The signal path successively comprises a seed laser source 1, a pulse stretcher 2, and a pulse compressor 5. The pump path comprises a pump laser source 6. The amplifier comprises a nonlinear crystal with chirped poled-period 4. The idler path successively comprises a spectral filter 9 and a pulse compressor 10 after the amplifier. Both the chirped signal pulse 3 from the pulse stretcher 2 and the pump pulse 7 from the pump laser source 6 incident into the amplifier, where energy continuously transfers from the pump pulse 7 to the chirped signal pulse 3 and a newly generated idler pulse 8. The amplified chirped signal pulse 11 is directly compressed by the first pulse compressor 5 while the generated idler pulse 8 is firstly filtered by the spectral filter 9 and then compressed by the second pulse compressor 10. After amplification and compression, both the signal and idler pulses are delayed, and the group delay is adjusted by the pump intensity.

In the present invention, CPPLN is selected as the nonlinear crystal 4 due to its favorable characteristic of large effective nonlinear coefficient. To support broadband amplification for ultrafast pulses, linearly varying domain periods of CPPLN should be designed as 29.2-32.2 μm (L=15 mm) for 100-fs seed pulses and 27.2-35.1 μm (L=20 mm) for 20-fs seed pulses when the wavelengths of the three interacting waves are set to 1064 nm (pump), 1550 nm (signal), and 3393 nm (idler), respectively. It is noteworthy that the present invention is not limited to specific crystal. For example, chirped-period-poled $KTiOPO_4$ (CPPKTP), another widely-used crystal, is also a good candidate for the present invention. In addition, owing to the involved group-velocity mismatch, the seed signal should be highly chirped to ensure a good temporal overlap among the three interacting waves.

The broadband response characteristic of GVM-resulted cascaded nonlinearities makes ultrafast group-velocity control possible. The nonlinear coupled-wave equations are applied to simulate the proposed method with ultrafast signal incidence. In the numerical simulation, the 100-fs seed signal with a 10th-order super-Gaussian spectrum is stretched to 90 ps that overlapped with the 100-ps pump pulse, and the compressor 5 compensated the crystal GVD and the phase imposed by the stretcher 2. For the signal pulse, it will experience a cascaded nonlinear phase that linearly varies with frequency in the small-signal amplification regime where the chirped signal is very weak ($I_{s0}/I_{p0}=10^{-15}$), as shown in FIG. 3A. Such a cascaded nonlinear phase directly contributes to a pulse shift in the time domain which can be as large as the signal pulse duration. At a moderate gain of $G_0=10^8$, the signal group delay of −74 fs is obtained, as shown in FIG. 3B. By contrast, the output signal phase in the unpumped situation ($G_0=1$) is uniformly flat over the spectrum, showing that the higher-order crystal dispersions are negligible to 100 fs pulses. It is important to point out that the proposed method is broadband owing to the deliberately introduced chirped quasi-phase-matching. As shown in FIGS. 3A and 3B, both the spectral width (~8 THz) and pulse duration (~100 fs) nearly remain unchanged during the signal amplification. Notably, the pulse profile after amplification is nearly identical to that of the seed, showing high fidelity in manipulating group velocity.

In addition, the signal group delay is shown to be adjusted by the pump and signal intensities. As shown in FIG. 3C, the signal group delay linearly increases with logarithmic gain, $G_0$, and can reach to −114 fs at $G_0=10^{12}$, which exceeds the pulse duration. However, the signal group delay decreases rapidly with the increase of seed intensity, $I_{s0}/I_{p0}$, or optical parametric amplification efficiency, as shown in FIG. 3D. In particular, signal group delay eventually vanishes at strong seeding where the optical parametric amplification efficiency is at a maximum. Thus, the efficient control of the signal group delay should be implemented in the small-signal amplification regime.

On the contrary, idler group delay takes place in the saturated amplification regime and increases with the optical parametric amplification efficiency. As shown in FIG. 4A, a maximal idler delay of −65 fs is achieved near the peak efficiency. Again, the production of idler group delay is a consequence of the cascaded nonlinear phase induced at the idler, as shown in FIG. 4B. Because the idler group delay strongly depends on the saturation degree of amplification (i.e., optical parametric amplification efficiency), flattop spectrum of the seed signal is necessary such that all the spectral components have the same conversion efficiency. In the simulation, both uniform pump pulse and seed signal spectrum, with a $10^{th}$-order super-Gaussian profile are adopted. As a result, the idler spectrum is quite flat in its middle range, and thus the cascaded nonlinear phase shows a linear frequency dependence that is required for perfectly delaying pulses.

In the spectral edges, however, both the idler spectrum and cascaded nonlinear phase are distorted. As shown in FIG. 4C, the compressed 110-fs idler pulse has a significant distortion that reduces intensity by 25%, compared with the Fourier-transform (FT) of its spectrum. Nevertheless, idler pulse fidelity can be effectively improved by spectral filtering. With a spectral filter 9 that cuts the spectral edges and transmits 90% of the idler spectrum, the compressed idler pulse can maintain an intensity as high as the FT-limited pulse, as shown in FIG. 4D, and thus a high fidelity pulse can be achieved. Notably, an additional GVD at the idler that induced by the chirped quasi-phase-matching structure is subtracted in the calculations and compensated by the second pulse compressor 10.

Finally, the pulse fidelity of the proposed method is addressed by focusing on the bandwidth and noise issues. Referring to the signal pulse fidelity, a seed signal duration of 20 fs is employed in the simulations. Because of the wider bandwidth, higher-order dispersions induce optical parametric phases in the optical parametric amplification and thus degrade the pulse compression. Consequently, the signal pulse quality is severely degraded, as shown in FIG. 5A, the relative intensity of the compressed pulse to its FT-limited is only 75% at $G_0=10^8$. Additionally, the fidelity of 20-fs signal pulses is worse and worse with the increase of $G_0$, while 100-fs signal pulses can always keep high fidelity in the present invention, as shown in FIG. 5B. Referring to the idler pulse fidelity, the seed signal noise is taken into account at a seed signal duration of 100 fs in the simulations. Because of the idler pulse is controlled in the saturated amplification regime, the seed signal noise significantly increases the idler delay and degrades the pulse fidelity, as shown in FIGS. 5C and 5D. It is noteworthy that the noise in the seed signal or the amplifier noise has little influence on the signal group-velocity control because it is controlled in the small-signal amplification regime.

In conclusion, an ultrafast group-velocity control method based on optical parametric amplification in chirped quasi-phase-matching structures is demonstrated. GVM-resulted cascaded nonlinearity possesses a broadband resonance characteristic and can be switched from normal to anomalous dispersion, enabling group-velocity control in the femtosecond regime. Our numerical studies have manifested that signal and idler group delay take place in the small-signal regime and saturated amplification regime, respectively. The demonstrated method can delay femtosecond pulses in time comparable with the signal duration and maintain high fidelity. These results enhance our understanding of cascaded nonlinearity with respect to its resonance nature and pave the way for putting ultrafast group-velocity control into reality.

One skilled in the art will understand that the embodiment of the present invention as shown in the drawings and described above is exemplary only and not intended to be limiting. It is thus seen that the objects of the present invention have been fully and effectively accomplished. Its embodiments have been shown and described for the purposes of illustrating the functional and structural principles of the present invention and is subject to change without departure from such principles. Therefore, the present invention includes all modifications encompassed within the spirit and scope of the following claims.

We claim:

1. An ultrafast group-velocity control device via optical parametric amplification in chirped quasi-phase-matching structures, comprising
   a signal path successively comprising a seed laser source, a pulse stretcher, and a first pulse compressor,
   a pump path comprising a pump laser source,
   an amplifier comprising a nonlinear crystal, and
   an idler path successively comprising a spectral filter and a second pulse compressor after the amplifier,
   wherein the pulse stretcher generates a chirped signal pulse, and the pump laser source generates a pump pulse;
   both the chirped signal pulse and the pump pulse incident into the amplifier, and energy continuously transfers from the pump pulse to the chirped signal pulse to form an amplified chirped signal pulse and a newly generated idler pulse;
   the spectral filter filters the newly generated idler pulse, and the second pulse compressor compresses the idler pulse; and the first pulse compressor compresses the amplified chirped signal pulse, and
   the nonlinear crystal is a chirped quasi-phase-matching crystal with linearly varied domain periods for different signal frequency, wherein each signal frequency is phase-matched and amplified at a phase-matching position in the chirped quasi-phase matching crystal and experiences a cascaded nonlinear phase beyond the phase-matching position in the chirped quasi-phase matching crystal.

2. The ultrafast group-velocity control device as described in claim 1, wherein the chirped signal pulse and pump pulse are collinear in the amplifier.

3. The ultrafast group-velocity control device as described in claim 1, wherein the nonlinear crystal is a chirped-period-poled $LiNbO_3$ (CPPLN), and wavelengths of three interacting waves are set to 1064 nm for pump, 1550 nm for signal, and 3393 nm for idler, respectively.

4. An ultrafast group-velocity control method via optical parametric amplification in chirped quasi-phase-matching structures as described in claim 1, comprising
   generating a chirped signal pulse by the pulse stretcher,
   generating a pump pulse by a pump laser source,
   incidenting both the chirped signal pulse and the pump pulse incident into the amplifier,
   continuously transferring energy from the pump pulse to the chirped signal pulse to form an amplified chirped signal pulse by phase-matching and amplifying signal pulse at the phase-matching position in the chirped quasi-phase matching crystal and creating the cascaded nonlinear phase beyond the phase-matching position in the chirped quasi-phase matching crystal,
   generating an idler pulse in the amplifier;
   filtering the newly generated idler pulse by the spectral filter to obtain a filtered idler pulse, and compressing the filtered idler pulse by the second pulse compressor to obtain a compressed idler pulse,
   directly compressing the amplified chirped signal pulse by the first pulse compressor to obtain a compressed chirped signal pulse, and
   adjusting group delay of the compressed chirped signal pulse and the compressed idler pulse by the pump intensity of the pump laser source.

5. The ultrafast group-velocity control method as described in claim 4, wherein magnitude of the chirped poled-period of the nonlinear crystal is determined by wavelengths of three interacting waves for pump, signal, and idler.

6. The ultrafast group-velocity control device as described in claim 4, wherein a range of the chirped poled-period of the nonlinear crystal is determined by a bandwidth of a seed pulse from the seed laser source.

7. The ultrafast group-velocity control device as described in claim 4, wherein the generated idler pulse is filtered to reduce bandwidth by 10%.

* * * * *